United States Patent
Kuchibhotla et al.

(10) Patent No.: US 7,844,265 B2
(45) Date of Patent: Nov. 30, 2010

(54) METHOD FOR APERIODIC MOBILE ASSISTED SLEEP MODE

(75) Inventors: Ravi Kuchibhotla, Gurnee, IL (US);
Raja S. Bachu, Des Plaines, IL (US);
Robert T. Love, Barrington, IL (US);
Ravikiran Nory, Grayslake, IL (US);
Kenneth A. Stewart, Grayslake, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1227 days.

(21) Appl. No.: 11/350,548

(22) Filed: Feb. 9, 2006

(65) Prior Publication Data
US 2007/0183355 A1    Aug. 9, 2007

(51) Int. Cl.
*H04W 24/00*    (2009.01)
(52) U.S. Cl. .................. 455/423; 455/574; 455/522; 455/69; 370/329
(58) Field of Classification Search ........... 455/423, 455/574, 522, 69; 370/329
See application file for complete search history.

(56) References Cited

U.S. PATENT DOCUMENTS

| | | | |
|---|---|---|---|
| 6,895,058 B2 | 5/2005 | Abrishamkar et al. | |
| 7,209,728 B2 * | 4/2007 | Ogura | 455/343.1 |
| 2004/0100940 A1 | 5/2004 | Kuure et al. | |
| 2004/0131025 A1 | 7/2004 | Dohler et al. | |
| 2005/0025093 A1 | 2/2005 | Yun et al. | |
| 2005/0100120 A1 * | 5/2005 | Barton et al. | 375/347 |
| 2008/0268844 A1 * | 10/2008 | Ma et al. | 455/436 |

* cited by examiner

Primary Examiner—Nghi H Ly

(57) ABSTRACT

Disclosed is a method for mobile assisted sleep mode to reduce current drain in packet based mobile systems. The method comprising the step of receiving (102) from a network a channel condition threshold. Then, monitoring (104) a channel condition while in sleep mode. Then exiting (110) sleep mode in response to the determination (108) that the monitored channel condition is greater than the channel condition threshold.

5 Claims, 2 Drawing Sheets

METHOD FOR APERIODIC MOBILE ASSISTED SLEEP MODE

FIELD OF THE INVENTION

The present invention relates generally to sleep mode and, more particularly to aperiodic mobile assisted sleep mode.

BACKGROUND OF THE INVENTION

Wireless networks such as Enhanced UMTS, 802.16e and the like are being designed to support the packet switched (PS) domain only. Traditionally the user equipment, also known as a mobile station or mobile is either in active state with a dedicated connection or in paging or dormant state (i.e. sleep mode). In paging state the mobile supports discontinuous reception wherein the mobile sleeps and wakes up at pre-determined intervals to check if the network has paged it. In 3GPP (UMTS) the mobile has an additional CELL_FACH state where it continuously monitors the downlink common control channel for activity.

The paging state helps to conserve battery charge by reducing the average current drain, however at the cost of some latency for downlink transmissions. The mobile can at any time send an uplink signaling message to indicate a need to transmit in the uplink. In CELL_FACH state the mobile is unable to conserve battery charge due to the continuous monitoring of the control channels.

One of the undesirable effects of the paging state is that there may be data that is to be exchanged with the mobile, however, when the mobile wakes at the predetermined time or frame, radio conditions are poor. It may also be possible that the mobile was in good conditions while it was in discontinuous reception (DRX) state, i.e. paging state, and the network was unable to communicate with the mobile. This has the undesirable result wherein data is exchanged in non-optimum radio conditions leading to the mobile being awake for a potentially longer time as a result of retransmission and in effect negating any potential battery savings. Therefore, it is desirable to be able to enter a sleep pattern that provides sufficient flexibility to the scheduler while simultaneously allowing the mobile to save battery whenever possible.

Moreover, while a mobile is in sleep mode, it is unable to communicate its channel conditions to the network until after wake-up. Thus the mobile may wake during undesirable channel conditions such that the mobile may not be able to communicate with the network or require multiple retransmissions to the network. In this case the mobiles wakes up and then goes back to sleep without any data exchange due to lack of sufficiently good channel conditions.

The various aspects, features and advantages of the present invention will become more fully apparent to those having ordinary skill in the art upon careful consideration of the following Detailed Description with the accompanying drawings described below.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
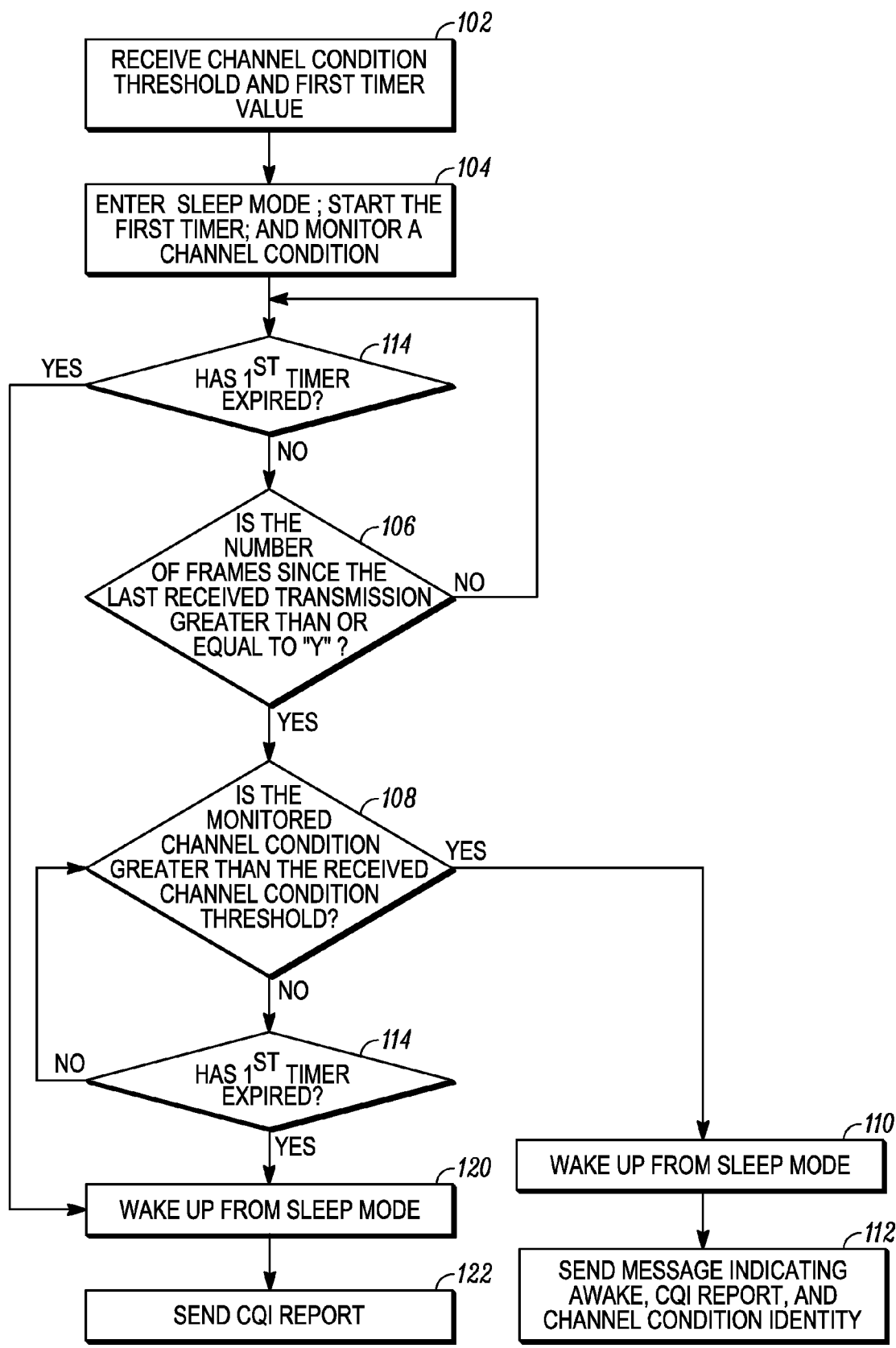
FIG. 1 is a first exemplary process flow diagram for aperiodic mobile sleep mode.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE DRAWINGS

While the present invention is achievable by various forms of embodiment, there is shown in the drawings and described hereinafter several examples of embodiments with the understanding that the present disclosure is to be considered an exemplification of the invention and is not intended to limit the invention to the specific embodiments contained herein as will become more fully apparent from the discussion below. It is further understood that the method for aperiodic sleep mode of the present invention may be used more generally in any application where it is desirable to provide signaling and current drain reduction.

It is to be understood that the mobile station (mobile) is a remote station coupled, wirelessly in this exemplary embodiment, to the network. It may also be referred to as a mobile, remote station, user equipment, user terminal or the like. In the embodiment described the mobile is wirelessly connected to the network though a plurality of base stations and network controllers. In this exemplary embodiment the mobile enters a sleep mode to conserve battery charge. It is understood that these are exemplary embodiments and that other criteria may be used for entering current drain reduction state.

In this exemplary embodiment, the device is an electronic device such as a radiotelephone. The radiotelephone described herein is a representation of the type of wireless communication device that may benefit from the present invention. However, it is to be understood that the present invention may be applied to any type of hand-held or portable device including, but not limited to, the following devices: radiotelephones, cordless phones, paging devices, personal digital assistants, portable computers, pen-based or keyboard-based handheld devices, remote control units, portable media players (such as an MP3 or DVD player) that have wireless communication capability and the like. Accordingly, any reference herein to the radiotelephone 100 should also be considered to apply equally to other portable wireless electronic devices.

Before describing in detail exemplary embodiments that are in accordance with the present invention, it should be observed that the embodiments reside primarily in combinations of method steps and apparatus components related to sleep mode of an electronic device. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

The instant disclosure is provided to further explain in an enabling fashion the best modes of making and using various embodiments in accordance with the present invention. The disclosure is further offered to enhance an understanding and appreciation for the invention principles and advantages thereof, rather than to limit in any manner the invention.

It is further understood that the use of relational terms, if any, such as first and second, such as a first timer and a second timer, and the like are used solely to distinguish one from another entity or action without necessarily requiring or implying any actual such relationship or order between such entities or actions.

Disclosed is a method for aperiodic mobile assisted sleep mode comprising the steps of receiving from a network a channel condition threshold. The device enters sleep mode and monitors a channel condition. The mobile exits the sleep mode in response to determining that the monitored channel condition is greater than the channel condition threshold.

FIG. 1 illustrates one exemplary process flow diagram for aperiodic mobile sleep mode. Sleep mode indicates a reduced current drain state of the device to conserve battery charge also know as sleep state, dormant state or paging state. In this exemplary embodiment, the mobile receives 102 from the network a channel condition threshold and a first timer value. The mobile may also receive a parameter indicating how many frames "Y" should pass since the last packet transmission or since the transition to sleep mode, before the mobile can wake and indicate good channel conditions to the network.

Upon entering the sleep mode 104, which is the paging state in this exemplary embodiment, the mobile performs minimal tasks including running a first timer, counting frames and monitoring a channel condition. The mobile starts the first timer 104 to track the length of time the device is in the sleep mode, which is a maximum length of time the device is in the sleep mode for this exemplary embodiment. The first timer is associated with the first timer value received. The first timer expires 114 upon reaching the first timer value.

Concurrently, i.e. while in sleep mode, the mobile station counts the number of frames that have passed since a predefined event has occurred. In this exemplary embodiment, the mobile determines 106 if "Y" frames have passed since the last reception of information. If "Y" frames have not passed, the mobile continues to sleep until "Y" frames pass or until the first timer expires 114. If "Y" frames have passed, then the mobile determines 108 if the measured channel condition is greater than the received channel condition threshold. The mobile determines this, in this exemplary embodiment, by turning on a receiver, measuring the channel condition, and then turning off the receiver. If the measured channel condition is above the threshold, the mobile exits (i.e. wakes up) 110 from the sleep mode. It is to be understood that if the mobile is not exchanging data or in the middle of receiving a plurality of data packets and enters sleep mode, the mobile may or may not count frames in this exemplary embodiment.

As discussed above, once awake, the mobile may then send 112 a message to the network indicating that it is awake (i.e. an awake indication message) and that the mobile is ready for data exchange (i.e. to or from the mobile). In this embodiment the message includes a channel quality indication (CQI) report indicating the channel quality value (i.e. the measured channel condition) or that the channel quality is above the threshold. Alternatively, in another exemplary embodiment, the awake indication message includes a buffer indication which can be composed of buffer occupancy information as well as buffer QoS information.

Continuing with the exemplary embodiment of FIG. 1, the time it takes for "Y" frames to pass is typically set less than the first timer value. Tracking the number of frames, "Y frames" that has passed since the last data reception ensures that when there is data to be sent, good channel conditions are exploited in this embodiment by a data transmission scheduler. For example, "Y" frames are counted to ensure that the mobile does not wake up promptly upon entering sleep mode due to being in good channel conditions (i.e. greater than the threshold), as the scheduler may not be ready to schedule the mobile so soon after the last transmission to the mobile. Defining a finite time, i.e. "Y" frames, before scheduling a next transmission to the mobile also helps maintain equity in opportunities for data transmission and reception among the different mobiles in a cell. In this embodiment, the mobile does not count frames specifically but uses a second timer which is then used to determine the number of frames that have passed because in this embodiment frames are defined by a finite time duration. In another example, if the device is receiving a data set and there is a long enough pause in reception between data packets or portions, the mobile may enter sleep mode due to the need for reading time of the received data (e.g. web page) by the user in case of web browsing and thus lack of further requests for more data in the interim period. The "Y" frame counter, e.g. second timer, will allow the mobile to wake, as long as the measured channel conditions are above the threshold, and then receive the remainder of the data set. In this embodiment, the mobile will not wait until the first timer expires to wake from sleep mode.

If the mobile determines 106 "Y" frames have passed and determines 108 that the monitored channel condition is not greater than or equal to the received channel condition threshold, the mobile will continue to monitor the channel condition and awake when the channel condition is greater than the threshold or awake when the first timer has expired 114. It should be noted that the action of monitoring channel conditions requires lower power expenditure in the mobile than being fully awake and monitoring control channels for scheduling messages. In response to the channel condition improving above the threshold, the mobile exits 110 from the sleep mode. The mobile then may send 112 a message to the network indicating that it is awake. The mobile may also include in the message the CQI report, a channel condition identity and the like. The channel condition identity indicates to the network which channel condition is being sent in this embodiment.

As discussed above, the first timer starts when the mobile enters sleep mode. If the timer has expired, the mobile wakes up 120. In this case it is not necessary to indicate to the network that the mobile is awake since the network has configured the mobile to wake up at these intervals defined by the first timer in this embodiment. The mobile may however indicate it's channel condition on wake up in order to assist the network in scheduling data transmissions. This ensures that although the channel conditions may not be as desired, the mobile will communicate with the network and not sleep for an undesired length of time and miss incoming calls for example.

It is understood that one of ordinary skill in the art will appreciate that a plurality of channel conditions may be monitored. For example, the channel quality may be indicated by the signal to noise ratio, bit error rate, frame error rate or the like. The channel condition threshold may be set by the network operator to satisfy data scheduling in order to optimize efficiency of the system and other attributes that relate to signal quality that may be based a plurality of attributes. For example, the scheduler of the network may target transmissions to the mobile based on a number of factors and may base the channel condition threshold and the first timer value on the traffic quality of service (QoS) class, the channel conditions of the mobile, buffering capability at the network, last time mobile was served (e.g. fairness criterion) and the like.

In another embodiment, the channel condition threshold is adapted by the mobile to a level within preset tolerances or channel condition threshold limits. For example, the mobile may adapt to a channel condition threshold between an upper channel condition threshold limit and a lower channel condition threshold limit. The threshold limits may be specified by the network to the mobile. This allows the mobile to account for changes in nominal channel conditions. For example, if a mobile enters a building with 15 dB penetration loss then the mobile would adapt or change the threshold so that a desired mean time between wake ups is achieved. In one embodiment, the mobile receives from the network a channel condition upper threshold limit and channel condition lower threshold limit. The mobile may then select the threshold as long as the threshold is between the upper limit and the lower limit to achieve a mean time between wake ups.

Once the mobile is awake it may either have data to send to the network or the network may have data to send to the mobile. If the mobile has data to send, once awake, the mobile begins the data exchange procedure to send the data, and the mobile indicates to the network it has data to send. If the mobile does not have data to send, the mobile must determine whether the network has data to send to it and whether it should re-enter sleep mode.

Data reception from the network may occur by a plurality of methods. In one exemplary embodiment, after the mobile sends the awake indication message, the mobile remains awake to receive data within the next frames. For example, once the network receives the awake indication message, the network will begin sending data to the mobile within the next immediately available transmission frame. In this embodiment the mobile remains awake and begins to receive the data. If the mobile does not receive any data or a data pending indicator, the mobile will reenter the sleep mode and continue with the method discussed above.

In one exemplary embodiment, after the mobile sends the awake indication message, the mobile waits for a period of X frames which may be determined by a third timer, for an indication from the network that there is data waiting to be sent to the mobile. As discussed above, if the mobile does not receive anything from the network within X frames, it re-enters sleep mode.

In this exemplary embodiment X is associated with the number of frames the network needs to process the received CQI report and schedule a transmission of the waiting data for example. It is to be understood that the number of frames, X, may be related to other network parameters such as scheduling due to network congestion, data size, data type or the like.

Figure 2:
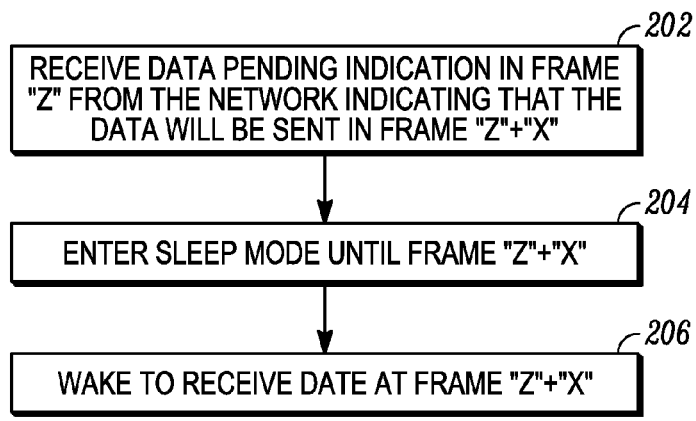
FIG. 2 is a second exemplary process flow diagram for aperiodic mobile sleep mode.

FIG. 2 illustrates an exemplary process flow diagram for data exchange after the mobile exits sleep mode. In this exemplary embodiment, the mobile, after waking up, receives 202 a pending downlink (DL) data indication. In one embodiment the network indicates 202, for e.g. in frame "Z," that it has data and it will be scheduled, based on the channel condition knowledge of the mobile. The mobile may be required to monitor continuously for a scheduling message or the network may indicate when the mobile will receive a scheduling message for e.g. after X frames. After receiving the DL data indication, the mobile may sleep 204 until the data is to be received, i.e. wait Z+X frames, then wake up 206 in time to receive the data in Z+X frames. The number of frames, Z+X, represents that the data will be transmitted from the network "X" frames past frame "Z." It should also be noted that "X" may also equal zero and therefore receive that data beginning at frame "Z."

Figure 3:
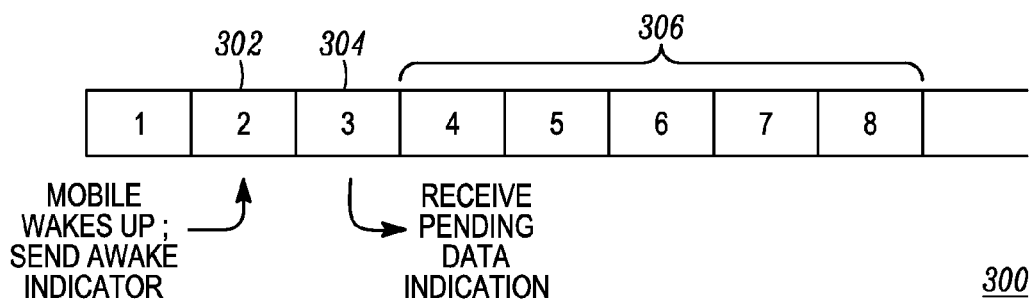
FIG. 3 is a first exemplary scheduling mechanism time sequence for aperiodic mobile sleep mode.

FIG. 3 illustrates an exemplary scheduling mechanism time sequence for aperiodic mobile sleep mode. FIG. 3 shows frames 300 of the sequence in which data is scheduled to be transmitted or received by the mobile. FIG. 3 illustrates that the mobile wakes up in frame two 302 and indicates to the network that it is awake. The mobile in frame three 304 receives a pending downlink (DL) data indication. In this embodiment the mobile remains awake through at least frames four through eight 306 and continuously monitors for data from the network.

Figure 4:
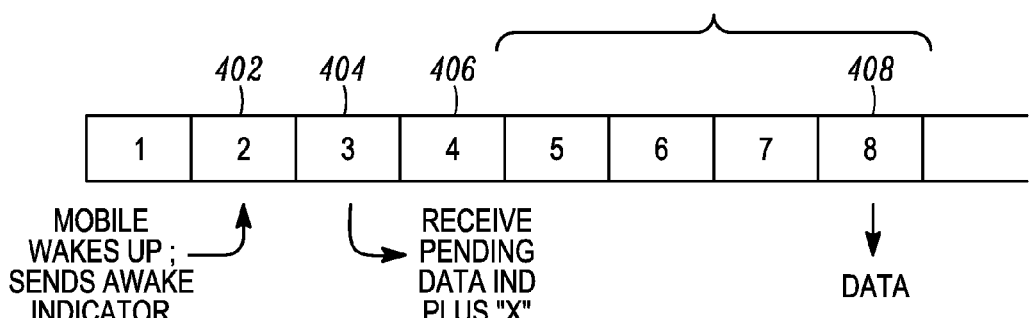
FIG. 4 is a second exemplary scheduling mechanism time sequence for aperiodic mobile sleep mode.

FIG. 4 illustrates an alternative exemplary scheduling mechanism time sequence for aperiodic mobile sleep mode. FIG. 4 shows frames 400 of the sequence in which data is scheduled to be transmitted or received by the mobile. FIG. 4 in conjunction with FIG. 2 illustrates that the mobile wakes up in frame two 402 and indicates to the network that it is awake. The mobile in frame three 404 receives a pending downlink (DL) data indication and the mobile receives an indication as to when the mobile will receive a scheduling message, for example at frame "X." In this embodiment the mobile may then enter sleep mode in frame four 406 and wake in frame "X", which is frame eight 408 in this exemplary embodiment.

In this exemplary embodiment, the mobile may continue to sleep between frames Z and X, and may also continue to monitor the channel condition and wake up prior to the predetermined time (e.g. the first timer expiring) if the channel condition increases above the threshold. However, if the first timer expires at any time, regardless of the channel condition, the mobile wakes up 120 and may send an indication to the network that it is awake and waits for a traffic-awaiting -for-mobile indication.

Figure 5:
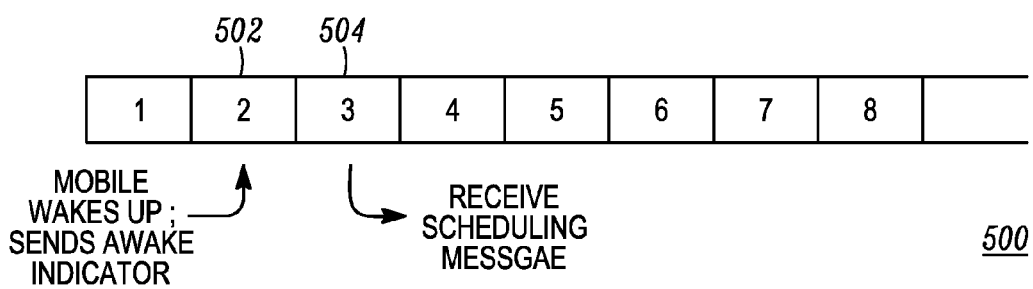
FIG. 5 is a third exemplary scheduling mechanism time sequence for aperiodic mobile sleep mode.

In yet another exemplary embodiment of frames 500 for a scheduling mechanism time sequence, illustrated in FIG. 5, the network may also indicate, with the pending data indicator, the resource allocation to the mobile. The mobile, after waking in frame two 502, receives in frame three 504 the scheduling message thereby allowing for a faster delivery of data, i.e. sending the data as immediately as possible with high speed networks, instead of sending the pending data indicator as discussed above.

Other parameters in addition to channel condition may be used to determine when the mobile wakes from sleep mode. In one exemplary embodiment, the mobile can wake and provide its channel condition and an attribute linked to its current speed or estimated Doppler of the device. For example, if the device is moving at a high rate of speed, the probability that the channel condition will improve quickly is greater than if the mobile station is moving at a slow rate of speed. The network may instruct the mobile to go back to sleep until a certain change in channel condition or until a certain second timer has expired depending on the received attribute. A shorter timer may be established when the mobile is moving at a relatively high rate of speed such as in a moving vehicle on an expressway. In another exemplary embodiment, the mobile is stationary and the probability that the channel condition will improve quickly is lower. In this case the network may have some data for the mobile and may upon determining that the data is of background traffic QoS class, instructs the mobile to go to sleep until some improvement in channel conditions occurs given the network's current load. In any condition, the mobile may reset these parameters upon changing the serving cell.

In yet another embodiment, when the data to be exchanged belongs to a background QoS class, the network may provide an indication to the mobile that there is data pending but that the mobile should not expect reception until the mobile channel condition improves. The network may require the channel condition to improve above the channel condition threshold or provided another threshold to the mobile. In this exemplary embodiment, the mobile may also use a third independent value that has been pre-determined and stored in the mobile. In this embodiment, the mobile reports that it is awake to the network once it reaches this value. In this exemplary embodiment, the mobile station exits 120 sleep mode after the first time has expired and while the channel condition is below the channel condition threshold. The mobile receives a pending data indication but the mobile also receives a message to go back to sleep until the measured channel condition is greater than or equal to the channel condition threshold. In this embodiment, the network determins that the data is of lower priority, that it is background QoS class data in this exemplary embodiment, and that the mobile should sleep until there are better channel conditions to receive the data. The network may also determine that the data requires a certain level of QoS and therefore instruct the mobile to resume sleep mode until the channel condition improve to a level appropriate for the required QoS.

The mobile station may enter and exit sleep mode following a plurality of sleep and wake patterns which are known as discontinuous reception (DRX) modes in one exemplary communication system wherein the time that the mobile is in sleep mode and the time the mobile is awake is derived from a predefined discontinuous pattern. In this exemplary embodiment, the mobile has a plurality of DRX patterns (also referred to as modes) that are used in the paging state to maximize energy efficiency (i.e. current drain on the battery). The DRX mode used, in this exemplary embodiment, depends upon the mobiles current estimate (i.e. measurement) of the channel condition and whether the measured value is above or below the channel condition threshold.

In addition this could also be based on network provisioning of the channel condition threshold. The mobile indicates to the network that it is awake, checks to see if data is buffered and goes to sleep on receiving no indication of pending data or the data itself. The mobile indicates to the network that it is awake (including a channel condition report) as opposed to awaking at some predetermined times. During bad channel conditions the mobile may prefer to sleep longer in order to ensure that too much battery is not wasted in receiving data through multiple retransmission attempts, esp. when the data to be received is of a background QoS class (such as email download). By ensuring more frequent wake-ups during good channel conditions we can ensure that less data needs to be buffered at the network and also that a smaller amount of such un-sent data will need to be sent over to the target base station on change of serving cell.

Note that in all embodiments, the mobile may have another overlapping DRX cycle that is determined by the network based on the maximum delay tolerable for voice. Then, even when the mobile is in comparably bad channel conditions, the mobile may still need to be scheduled for terminating a voice call for example. It is also possible to receive different thresholds based on traffic type. For example, a higher threshold being set for high-rate data services and lower threshold for low-rate data services. For example, for voice data exchange, a low data rate service can be delivered even without the best possible channel conditions. With voice service there is little flexibility in terms of having to schedule the mobile (i.e. when a user ends a call, signaling should occur relatively quickly); however, for data applications there is sufficient flexibility that can be exploited given sufficient mechanisms for communication between mobile and network. In this case, upon wake-up, the mobile may indicate which of the channel quality thresholds it is currently meeting. In the case where the mobile has been provided with a first and second channel condition threshold corresponding to the different QoS requirements for example, the mobile may initially be in channel conditions that exceed the first channel condition threshold but not the second channel condition threshold. The mobile then indicates to the network that it's channel condition exceeds the first threshold and the network may schedule the mobile if there is data to be transmitted. When the mobile's measurement of the channel conditions exceeds the second channel condition threshold, it will send another indication that it's channel condition has exceeded the second channel condition threshold, following which it may be scheduled by the network.

It will be appreciated that embodiments of the invention described herein may be comprised of or performed by one or more conventional processors and unique stored program instructions that control the one or more processors to implement, in conjunction with certain non-processor circuits, some, most, or all of the functions of aperiodic mobile sleep mode described herein. The non-processor circuits may include, but are not limited to, a radio receiver, a radio transmitter, signal drivers, clock circuits, power source circuits, and user input devices. As such, these functions may be interpreted as steps of a method to perform aperiodic sleep mode. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

While the present inventions and what is considered presently to be the best modes thereof have been described in a manner that establishes possession thereof by the inventors and that enables those of ordinary skill in the art to make and use the inventions, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. A method for reducing current drain in a mobile device comprising:
    providing a mobile device including an aperiodic mobile assisted sleep mode;
    receiving from a network a channel condition threshold;
    receiving an indication of pending data indication;
    entering the aperiodic mobile assisted sleep mode and monitoring a channel condition;
    determining that the channel condition is below the channel condition threshold;
    waiting to exit the aperiodic mobile assisted sleep mode and send an awake indicator to the network until the channel condition is greater than the channel condition threshold.

2. The method of claim 1, further comprising receiving a first channel condition threshold and a second channel condition threshold from a network.

3. The method of claim 1, further comprising sending a first message including an awake indication and a first channel condition report indicating a first channel condition.

4. The method of claim 2, further comprising changing from a first sleep cycle to a second sleep cycle in response to determining that the determined channel condition has changed from the first channel condition to the second channel condition.

5. The method of claim 1, further comprising receiving a first DRX cycle indicator and a second DRX cycle indicator from the network.

* * * * *